United States Patent [19]
Sawaki et al.

[11] Patent Number: 4,707,121
[45] Date of Patent: Nov. 17, 1987

[54] COPYING APPARATUS

[75] Inventors: Akira Sawaki; Seitaro Kasahara, both of Hachioji, Japan

[73] Assignee: Konishiroku Photo Industry Co., Ltd., Tokyo, Japan

[21] Appl. No.: 818,619

[22] Filed: Jan. 13, 1986

[30] Foreign Application Priority Data

Jan. 17, 1985 [JP] Japan .................................. 60-6135
Jan. 28, 1985 [JP] Japan .................................. 60-13863
Jan. 28, 1985 [JP] Japan .................................. 60-13864
Jan. 28, 1985 [JP] Japan .................................. 60-13865
Jan. 28, 1985 [JP] Japan .................................. 60-13869

[51] Int. Cl.$^4$ ............................................. G03B 27/52
[52] U.S. Cl. ........................................ 355/40; 355/75
[58] Field of Search .............................. 355/40, 64, 75

[56] References Cited

U.S. PATENT DOCUMENTS 4,029,414 6/1977 Rubenstein ....................... 355/40 X
4,192,606 3/1980 Lewis ................................... 355/40
4,198,157 4/1980 Johnson .............................. 355/40

Primary Examiner—Richard A. Wintercorn
Attorney, Agent, or Firm—Frishauf, Holtz, Goodman & Woodward

[57] ABSTRACT

A copying apparatus comprises a platen for setting a document thereon and a display device for displaying additional information such as date or time in the proximity of the platen, the copying apparatus being capable of copying the additional information displayed by the display device along with the document information. A display plane of the display device is arranged so as to incline toward the exposure lamp. When the display device indicates numerical data as the additional information, a device is provided for decreasing or increasing both gradually and automatically the number indicated by the display device for each document.

7 Claims, 19 Drawing Figures

⓪ MODE SELECTION BUTTON 52 ON

① STOP/CLEAR BUTTON 43 ON
(INPUT IN 6TH DIGIT)

② KEY "1" OF TEN-KEY ARRAY 40 ON
(INPUT IN 5TH DIGIT)

③ KEY "2" OF TEN-KEY ARRAY 40 ON
(INPUT IN 4TH DIGIT)

④ KEY "3" OF TEN-KEY ARRAY 40 ON
(INPUT IN 3TH DIGIT)

⑤ KEY "4" OF TEN-KEY ARRAY 40 ON
(INPUT IN 2ND DIGIT)

⑥ KEY "5" OF TEN-KEY ARRAY 40 ON
(INPUT IN 1ST DIGIT)

⑦ P-BUTTON 42 ON
(COMPLETION ON NUMBER-INPUTTING)

COPYING APPARATUS

BACKGROUND OF THE INVENTION

The present invention relates to a copying apparatus capable of copying also additional information such as a date or a number indicated by an display means when copying document information.

The present invention further relates to a copying apparatus equipped with a sorter and capable of copying simultaneously both an additional information such as a number or the like and a document information.

There have been proposals wherein a date (year, month and day or hour) and others are copied on a copy (e.g. Japanese Patent Publication Open to Public Inspection No. 39124/1978). On the conventional apparatus, however, all the apparatus can do is to cause an display means to indicate a date or an inputted number and to copy them, which means that an operator should always input the following number for changing the number to be copied on a copy. Therefore, (A) when preparing materials (paginated) for the meeting containing a plurality of documents and others in desired number of copies, it has been necessary to take either one of (1) making copies after the input of consecutive numbers (page numbers) performed by an operator for each document. (2) eliminating consecutive numbers entered in the document after entering consecutive numbers for each document and making copies, or, (3) making copies without entering consecutive numbers and then entering consecutive numbers in the copies. Or, (B) when distributing copies to many locations, it has been necessary to take either one of (1) inputting a code number or the like representing each location for each copying operation, or (2) entering code numbers in copies.

In the case of paginating job in (A), however, the method of (3) requires extremely large amount of labor and even (1) and (2) methods require considerable amount of labor, which have been problems. In the case of (B), on the other hand, both (1) and (2) methods require the number-changing work for each copying, which has been a problem.

On the other hand, when the copies from plural documents are distributed to plural locations, if the copies for each location have a different number copied thereon, the copies having the same number have only to be distributed to a prescribed location, which reduces distribution failures. It is more convenient especially when a copying apparatus is equipped with a sorter (a copying apparatus having either a built-in sorter or a sorter connected to the copying apparatus), because each bin receives a round sum of copies for each location. On the conventional copying apparatus equipped with a sorter, however, a date or an inputted number is indicated by an indicating means and is only copied. In order to change the number to be copied on a copy, therefore, an operator has been requested to be sure to input a new number, Therefore, all it can do is only to deliver to each bin the copies having the same additional information recorded thereon, which means that the copying which meets an aforesaid object has been impossible.

OBJECTS AND SUMMARY OF THE INVENTION

The present invention has been devised in view of the aforesaid problems and its object is to provide a copying apparatus capable of significantly reducing the labor necessary for the work when preparing plural paginated materials containing plural kinds of documents or when putting different numbers on the copies from the same document.

Another object is to realize a copying apparatus capable of copying a different number on the copies for each bin of a sorter in the copying apparatus equipped with a sorter.

The present invention for solving the aforesaid problems is a copying apparatus capable of copying also additional information indicated by an display means when copying document information, which comprises an display means capable of indicating a date and a number as an additional information, a mode selection means that causes said display means to indicate a date or a number and a number-changing means capable of increasing gradually or decreasing gradually automatically aforesaid number for each copying or for each number when aforesaid display means is in a number-display mode.

Since the present invention is capable of increasing gradually or decreasing gradually automatically the number when the number-display mode is selected by the mode-selection means, the job for changing the number for each document or for each copying is not needed.

Further, the present invention for solving aforesaid problems is a copying apparatus comprising a sorter and capable of copying simultaneously both an additional information such as a number or the like and a document information, wherein said number is increased gradually or decreased gradually depending on whether an upward mode of a bin or a downward mode thereof respectively and thereby a copy or copies in each bin of aforesaid sorter are given different number copied on said copy or copies.

Since the present invention is capable of increasing gradually or decreasing gradually the number for each copying depending on whether an upward mode of a bin of the sorter or a downward mode thereof, the copies in each bin have a number copied thereon as an additional information which is different from that on the copies in other bin and is the same on the copies in the same bin.

DETAILED DESCRIPTION OF THE INVENTION

Figure 1:
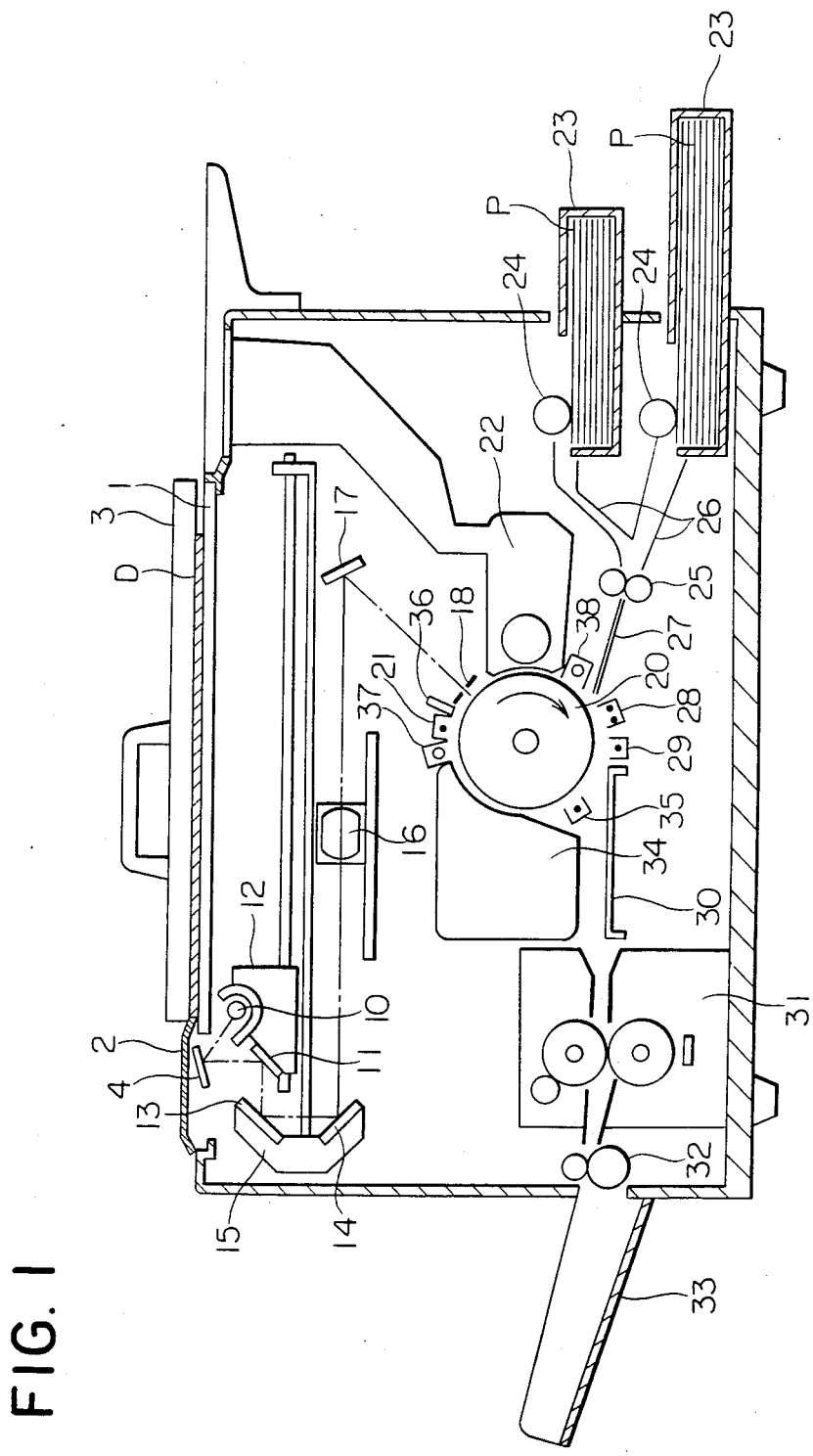
FIG. 1 shows a diagram of the mechanical structure of an example of the invention.

Referring to the drawings, the examples of the invention will be explained in detail.

Figure 2:
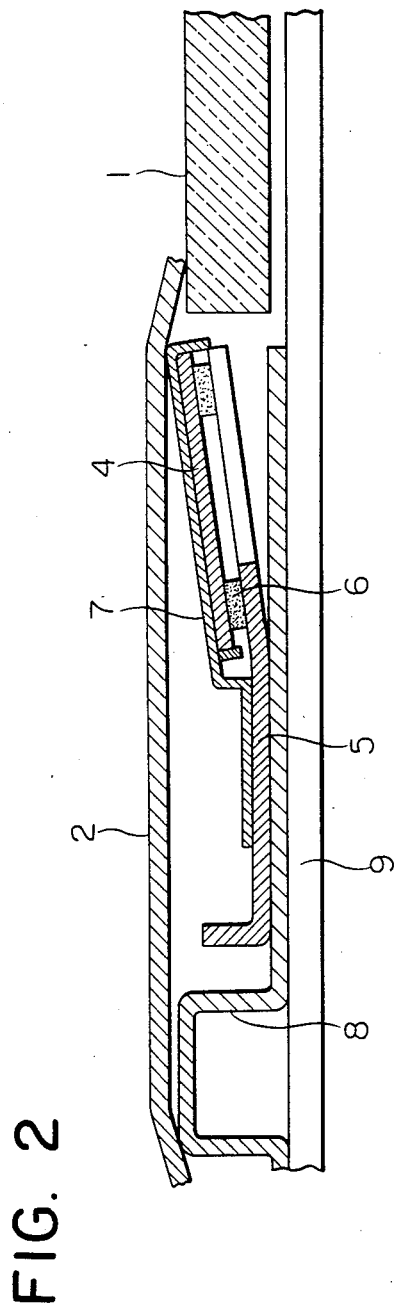
FIG. 2 is a sectional view in the vicinity of the scale plate in FIG. 1 (a cutting plane is parallel to the surface of FIG. 1)
Figure 3:
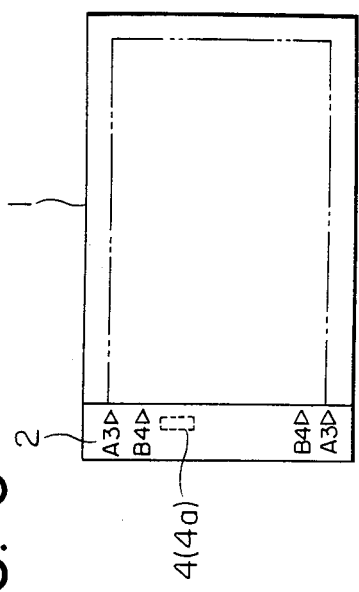
FIG. 3 is a plan view of the section near the scale plate in FIG. 1.
Figure 4:
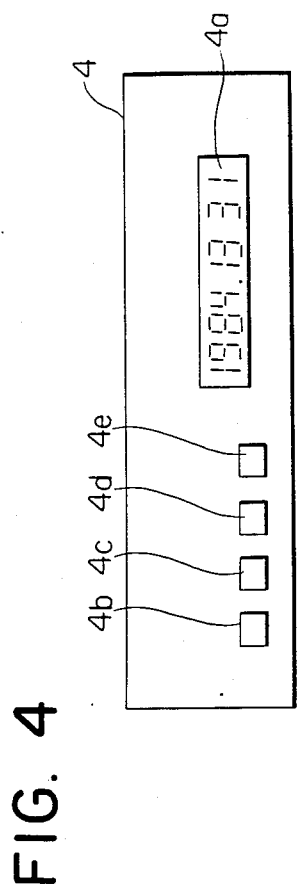
FIG. 4 is an illustration of the display module in FIG. 1.

FIG. 1 through FIG. 4 show the mechanical constitution of the example of an electrophotographic copying apparatus and as shown in FIG. 1, there is provided, at the center of the top portion of the main body of copying apparatus, the platen made of transparent glass on which the document D is to be placed and at the left edge of the platen 1, there is provided a scale plate 2 that instructs the placing position according to the size of the document D and there is further provided a platen cover 3 that covers the document D above the platen 1 in a way that the platen cover can swing down toward the front side. The document D is placed on the platen 1 according to the scale instructed by the scale plate 2 and then is covered by the platen cover 3, thus the movement of the document is restricted. In the vicinity of the middle point on the lower side of the scale plate 2, there is arranged an display module for example, a liquid crystal display device 4 in a way that the display portion 4a faces downward. In the present example, the display portion 4a is a liquid crystal of a reflection type which is capable of indicating a date and numbers with 7 segments. Incidentally, regarding the detail of how to mount the display module 4, it is preferable that the inclination angle from the horizontal is 5°~25°, and especially 10°~20° as shown in FIG. 2. The obverse side of the display module 4 is opposed to the plate 5 having an inclined plane and the display module 4 is held from its reverse side to the side of the plate 5 by means of the substrate holder 7, resisting against the elastic force of the cushion 6 arranged between the edge portion of the display module 4 and the plate 5, and then, the plate 5 is fixed to the main body panel 9 through the glass-stopper plate 8.

Incidentally, an inclination angle for mounting the aforesaid liquid crystal display device 4 may vary depending on the size of the device, the layout thereof, and the like. It is further preferable to change the inclination angle of the display module according to the irradiating angle of the exposure lamp against the reading position. An inclination angle should be avoided if it results in the situation where the primary pattern (a date or a number) indicated can not be read due to the light irradiated from the exposure lamp which advances toward the first mirror after the total reflection on the mirror-like surface of the display module.

There is provided first mirror unit 12 furnished with exposure lamp 10 and first mirror 11 under the platen 1 and inside of the main body of copying apparatus, so that the first mirror unit 12 is held in parallel with aforesaid platen 1 to be able to travel straightly from side to side in FIG. 2. Thus the entire surface of the document D can be scanned. An arrangement is further made so that second mirror unit 15 consisting of the joined second mirror 13 and third mirror 14 can travel straight from side to side in FIG. 2 and in parallel with the platen 1 at the speed which is one half of the first mirror, keeping the prescribed optical path length. The principal lens 16 is a lens into which the light reflected from the document D on the platen 1 enters after being reflected by aforesaid first mirror 11, second mirror 13 and third mirror 14 and an arrangement is made so that the light leaving aforesaid principal lens 16 reaches the photoreceptor drum 20 which serves as an image-carrier after being reflected on the fourth mirror 17 through the slit 18.

The role of the charging electrode 21 is to charge uniformly the photoreceptor drum 20. Therefore, the light from aforesaid optics system forms in sequence electrostatic latent images on the photoreceptor drum 20 that rotates clockwise in FIG. 2. The role of the developing unit 22 is to convert aforesaid electrostatic latent images on the photoreceptor drum 20 to visible toner images.

On the other hand, the paper-feeding unit for feeding a copy paper consists of paper-feed cassette 23 (two types are illustrated) wherein copy paper P is to be loaded, first paper-feed roller 24 for drawing out copy paper P one sheet by one sheet from the paper-feed cassette 23, second paper-feed roller 25 for feeding the copy paper P drawn out toward the photoreceptor drum 20, and the guide plates 26 and 27 arranged between aforesaid paper-feed cassette 23 and the second paper-feed roller 25 and between aforesaid second paper-feed roller 25 and a transfer electrode which will be described later, respectively. When copying, a sheet of copy paper P in the paper-feed cassette 23 selected is drawn out by the first paper-feed roller 24 and is fed, being guided by the guide plate 26, to the second paper-feed roller 25 which is driven by the signal of paper-feed timing wherein the lead edge of aforesaid toner image on the photoreceptor drum 20 agrees with that of the copy paper P in position.

The role of the transfer electrode 28 is to transfer the toner image on the photoreceptor drum 20 onto the copy paper P and the role of the separation electrode 29 is to separate the copy paper P from the photoreceptor drum 20. The copy paper P separated is fed, through the copy paper feeding means 30, to the fixing unit 31 where melting and fixing are made by the heat-fixing roller and the pressure roller and then the copy paper P is discharged by the paper-delivery roller 32 onto the paper-delivery tray 33. After the completion of transfer process, the residual toners on aforesaid photoreceptor drum 20 are removed by the cleaning device 34 and the cleaning neutralizing electrode 35 that performs A.C. corona discharging is provided in the step prior to the cleaning device for the purpose of easy removal of aforesaid residual toners. Further, on the rear step of the charging electrode 21, there is arranged charge-elimination portion 36 that eliminates with the light the charges on the non-image area in its attitude for facing the photoreceptor drum 20, for the purpose of preventing toners from adhering to the non-image area. Incidentally, 37 is a device for the exposure before charging and 38 is a device for the exposure before transfer.

Figure 5:
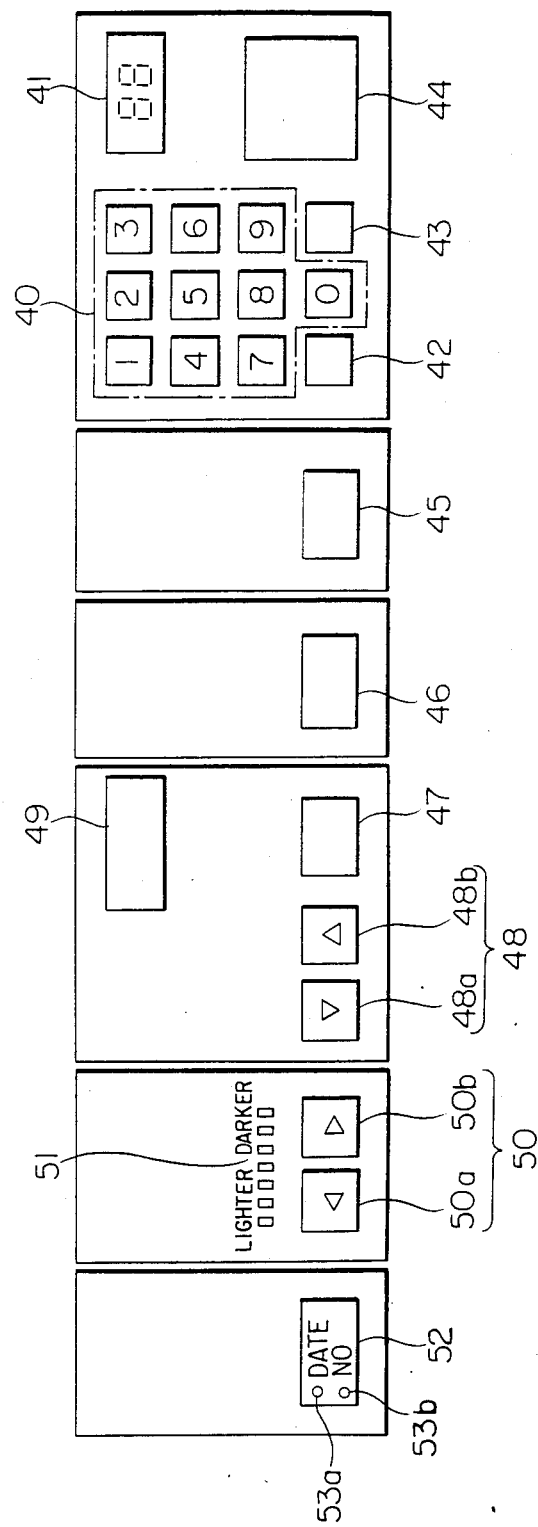
FIG. 5 is an illustration of an operation panel of the apparatus in FIG. 1.

FIG. 5 shows a main part of the operation panel of aforesaid example and the operation panel is located at the front side on the top of the main body of copying apparatus. In this drawing, 40 is a ten-key array for setting the number of copies desired and others and the set number of copies is indicated on LED 41. On the other hand, 42 is a button (hereinafter called P button) to be used when the functions such as the fixing for thick paper, interruption copying and others are required, 43 is a stop/clear button and 44 is a copy button. Further, 45 is an auto-mode button to be used for operating the system (APS) that detects the document size and automatically judges and selects the copy paper in desired size, 46 is a cassette selection button, 47 is a magnification-changeover button, 48 is a zoom button and 49 is an LED for indicating a magnification. The zoom button 48 is capable of changing the magnification stepwise with a certain interval under the zoom mode obtained by the magnification-changeover button 47 and 48a is an enlargement button and 48b is a reduction button. Further, 50 is a density-selection button which consists of density-down button 50a and density-up button 50b and the density selected is indicated by LED 50 for density display on the level of 7 steps.

Further, 52 is a mode-selection button to be used for copying additional information and it selects any one of (1) the mode wherein a date is copied as an additional information, (2) the mode wherein a number is copied as an additional information, and (3) the mode wherein no additional information is copied. When the mode-selection button 52 is pushed down successively, a cyclic mode-selection of 'mode (1) → mode (2) → mode (3)' is made and when the mode (1) is selected,. LED 53a is lit, when the mode (2) is selected, LED 53b for indicating a number mode is lit and when the mode (3) is selected, neither LED 53a nor 53b is lit.

Contents of display of the display module 4 under the date-copying mode include the display of a date (year, month and day) (e.g. the display of '1984.12.31' for December 31, 1984 as shown in FIG. 5) or the display of hour (e.g. the display of '16.40' for 40 minutes after 4 o'clock p.m.). When the display module 4 is equipped with functions of a permanent calendar and a clock, if the time-setting is made once using keys of 4b through 4e, no further time-setting is required.

Figure 6:
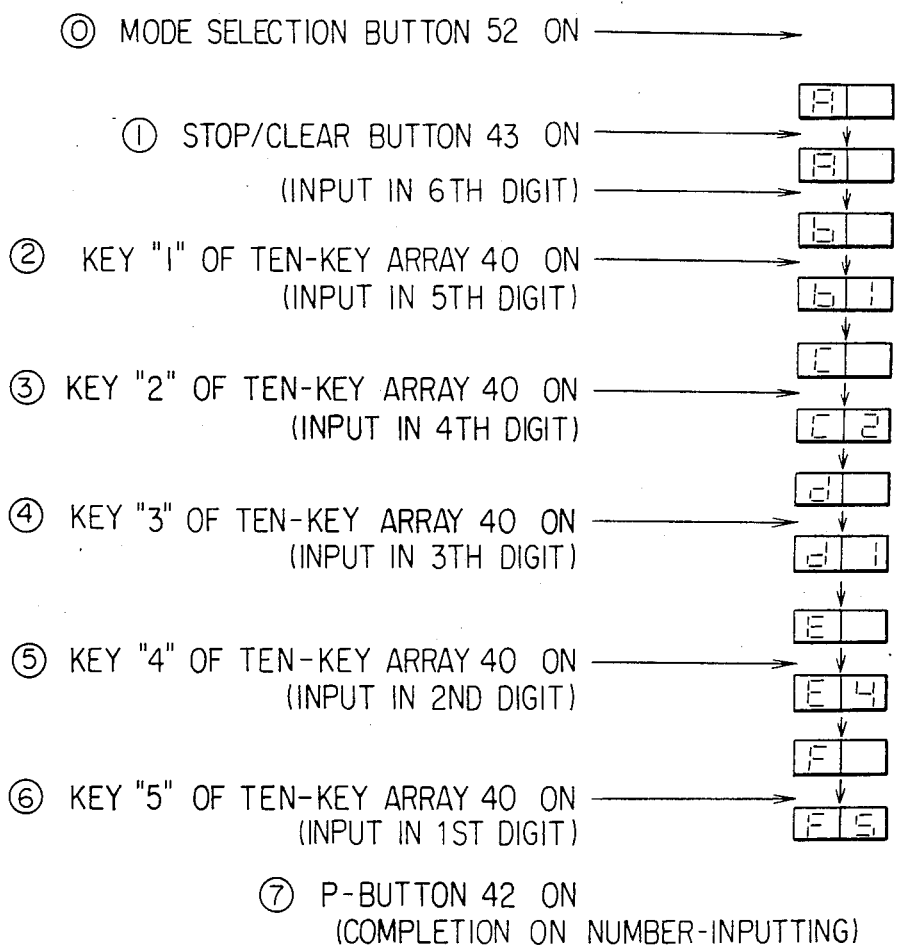
FIG. 6 is an illustration of a number-setting procedure in the number-copying mode.

On the other hand, the display itself in the number-copying mode is made on the figure of 6 digits maximum and when this mode is selected, A through F corresponding respectively to 6th digit through the first digit from the lowest position of the display itself are indicated successively at the position of the number of tens of LED 41 that is for indicating the set number of copies. If the number of each digit is inputted by the ten-key array 40 (in the case of 'blank', stop-clear button 43 is to be 'ON') and the P button 42 is caused to be 'ON' finally when any of aforesaid A through F is indicated, this data may be taken in the display module 4 at a certain interval. FIG. 6 shows an example wherein the number 12345 (6th digit from the lowest position is blank) is set. Incidentally, this example is so constituted that the inputted value appears on the first digit of LED 41 for the short period of time and then the next digit stands by for inputting.

Figure 7:
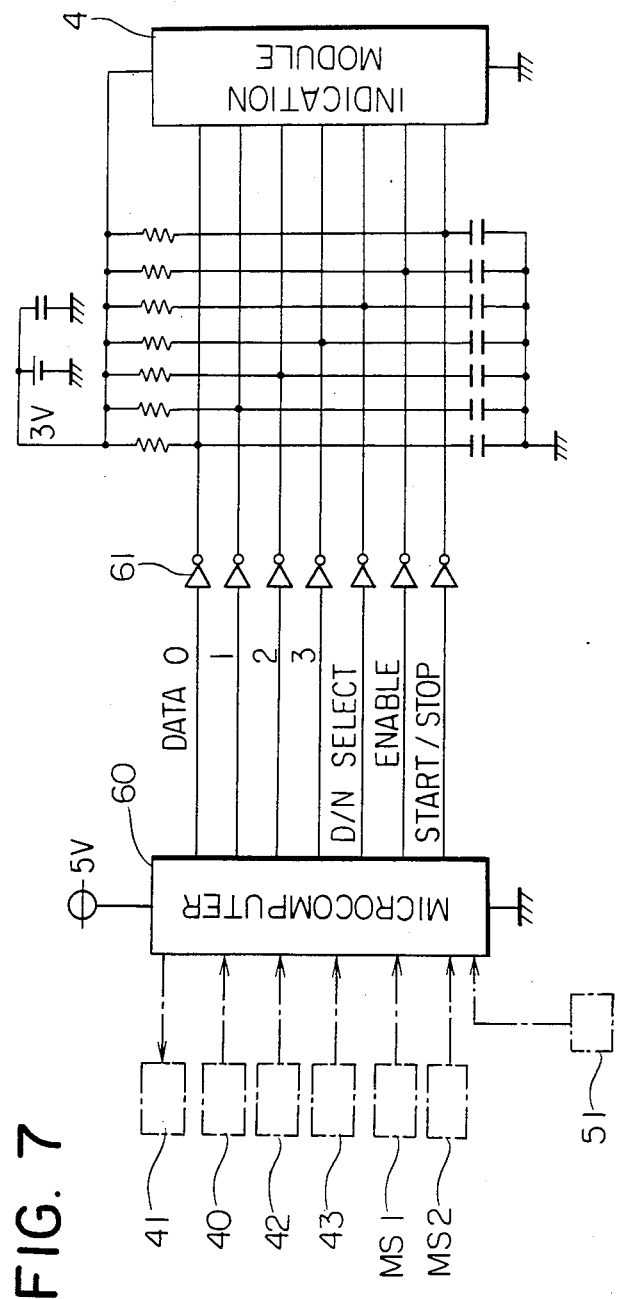
FIG. 7 is an illustration of transferring constitution of the data set, FIG. 8
Figure 8:
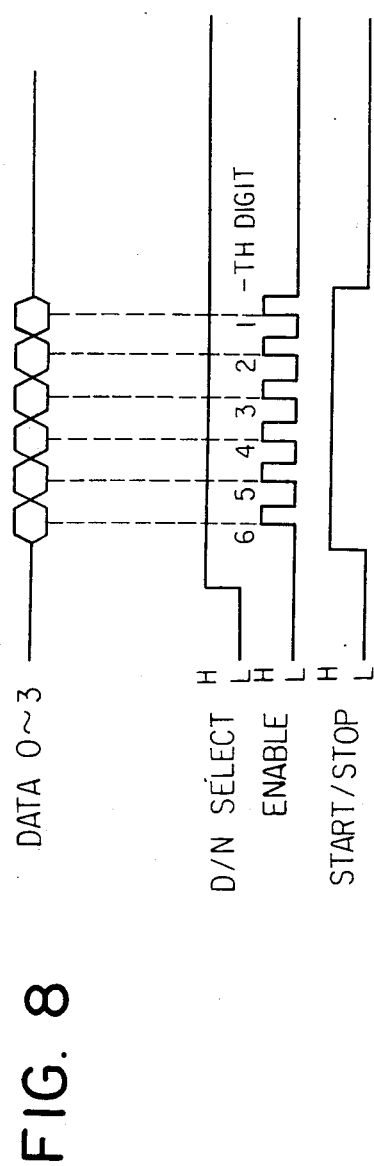
Figure 9:
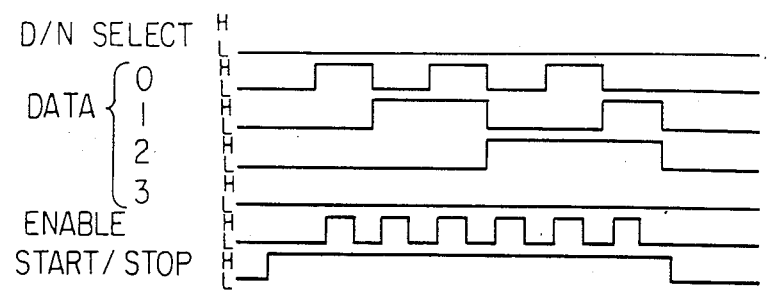
FIG. 9 is a time chart for the transferring of the data for numbers and FIG. 10 is a flow chart showing the routine for the number increment or decrement.

FIG. 7 shows an arrangement wherein microcomputer 60 for use of controlling the main body of copying apparatus transmits inputted data set to the display module 4 through the buffer 61. For this transferring of data, the signal lines equivalent to 8 bits are used and due to the fact that the data themselves are indicated with a BCD code, 4 bits (DATA 0-3) are allocated (blank is on H level for all 4 bits) and 1 bit is allocated to each of a signal D/N SELECT showing whether the data D(L) for the date or the data N(H) for the number, (the configuration wherein a D/N SELECT signal capable of transmitting even the data for a date is used is based on the assumption that when the display module 4 is not equipped with a clock function, the microcomputer 60 is required to obtain the data for a date from a clock module or the like and to transmit them to the display module 4) a signal ENABLE causing the data (DATA 0-3) to be taken in the display module 4 at its transient build-up and a signal START/STOP showing the transmission period of the data in H level. FIG. 8 shows a time chart for the transferring of the data N for the number and FIG. 9 shows a time chart wherein the number '123456' is transmitted actually.

Figure 10:
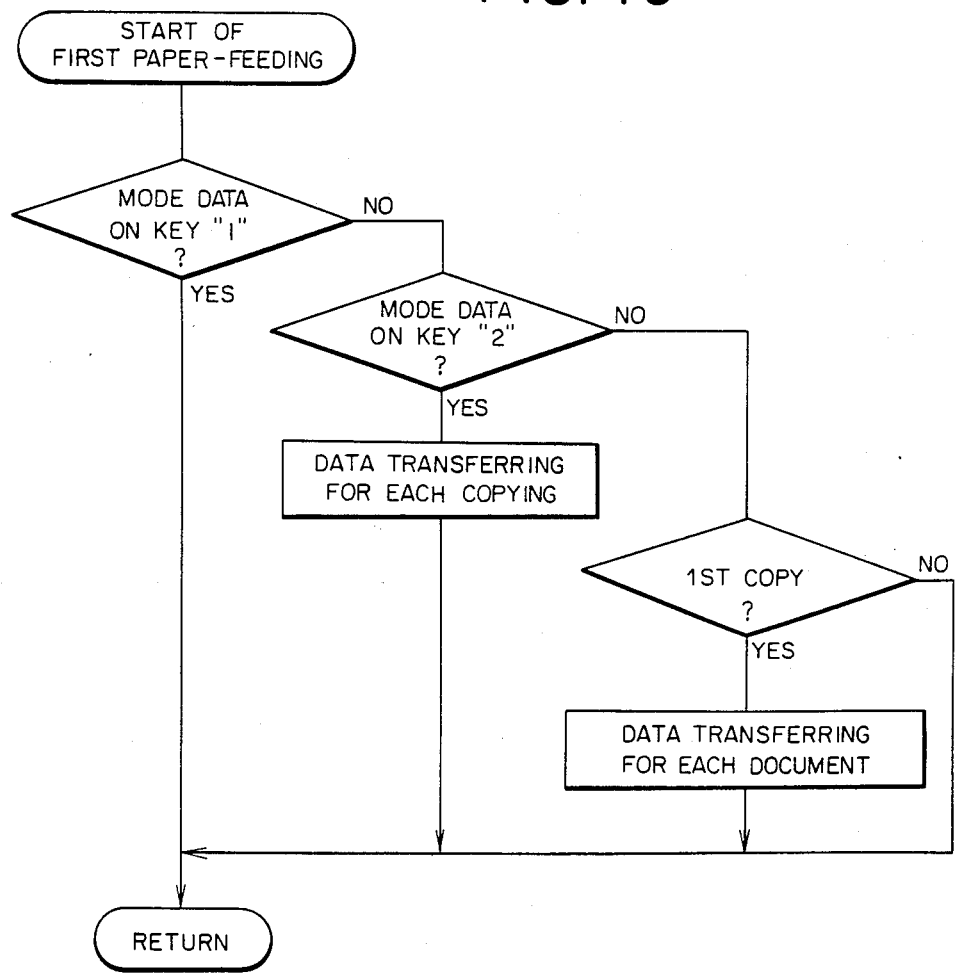

Further, on the present apparatus, turning on the main switch (unillustrated) with both STOP/CLEAR button 43 on the operation panel and the key '3' of ten-key array 40 depressed simultaneously enables the number of the display module 4 to be increased gradually automatically for each copying. Turning on the main switch with both STOP/CLEAR button 43 and the key '2' of ten-key array 40 depressed simultaneously enables the number of the display module 4 to be decreased gradually for each document (the change of document is detected by opening and closing of the platen cover). Further it is possible to lock the number of the display module 4 by turning the main switch on with both STOP/CLEAR button 43 and the key '1' of the ten-key array 40 depressed simultaneously. Actually, the microcomputer 60 writes the mode data that shows which key out of '3', '2' and '1' of the ten-key array 40 has been depressed during aforesaid operation on the corresponding area of the non-volatile memory in the main body of copying apparatus and after that, aforesaid mode data are read for each paper-feeding done by the first paper-feed roller 24 and new data based on aforesaid mode data read are transmitted, if necessary, to the display module 4, thus the number may be increased or decreased. FIG. 10 shows a flow chart of aforesaid routine.

In this routine, the microcomputer 60 decreases gradually the number only after confirming the completion of copying the number of copies for each document so that the number can be decreased gradually for each document correctly. Namely, there is made a confirmation that the microswitch MS2 for detecting paper delivery jamming is turned on within a certain period of time after the second paper-feed microswitch MS1 is turned on and that the microswitch MS2 for detecting paper delivery jamming is turned off within a certain period of time after aforesaid its being turned on, and under the condition that the copying is made each time aforesaid confirmation is made, the decrement of a number is made after the confirmations identical to the set number of copies are made for each document.

Further, the present example is so constituted that, if any one of aforesaid date-copying mode or number-copying mode is selected, such additional information can be copied together with document information. Namely, the start timing of the second paper-feed roller 25 has been advanced compared with a conventional apparatus so that the lead edge of the toner image (on the photoreceptor drum 20) including the additional information agrees with the lead edge of the copy paper P in position. Further, if the start timing of the second paper-feed roller 25 is advanced for the document whose page surface is mostly covered with document information, the trailing edge of the document information may not be copied, therefore the reduction copying is to be done under such mode of date-copying or number-copying.

When the length of the document in the direction of optical scanning is 'l' and the length of additional information is 'a', the magnification for the reduction copying represented by $m=l/(l+a)$ is optimum. However, the magnification is set in advance within a range of about $m=0.90 \sim m=0.98$ because it is inconvenient to change manually the value of 'm' each time according to the document size.

Before copying with aforesaid magnification of 'm', the actions such as (a) changing the lens position after changing the focal length of principal lens 16, (b) moving the principal lens 16 and the second mirror unit 15, and (c) changing the focal length of the principal lens 16 and moving the second mirror unit 15, are to be taken on the optical system first so that an image with a magnification of 'm' can be formed on the photoreceptor drum 20. The change of the focal length of the principal lens 16 is made by either using a zoom lens as a principal lens 16 or adding an attachment lens. Further, as a method for moving the optical unit to the position of magnification 'm', a pulse motor may be used. For example, the optical unit may be moved to the position of magnification 'm' by providing the home position sensor and by controlling the motor with a pulse number beginning from the home position.

Thus, the optical unit, after moving to its initial position with a magnification 'm' for the projection onto the photoreceptor drum 20, changes the scanning speed of the first mirror unit 12 to 1/m. Copied images thus obtained do not have any missing of document information caused by the addition of additional information.

Figure 11:
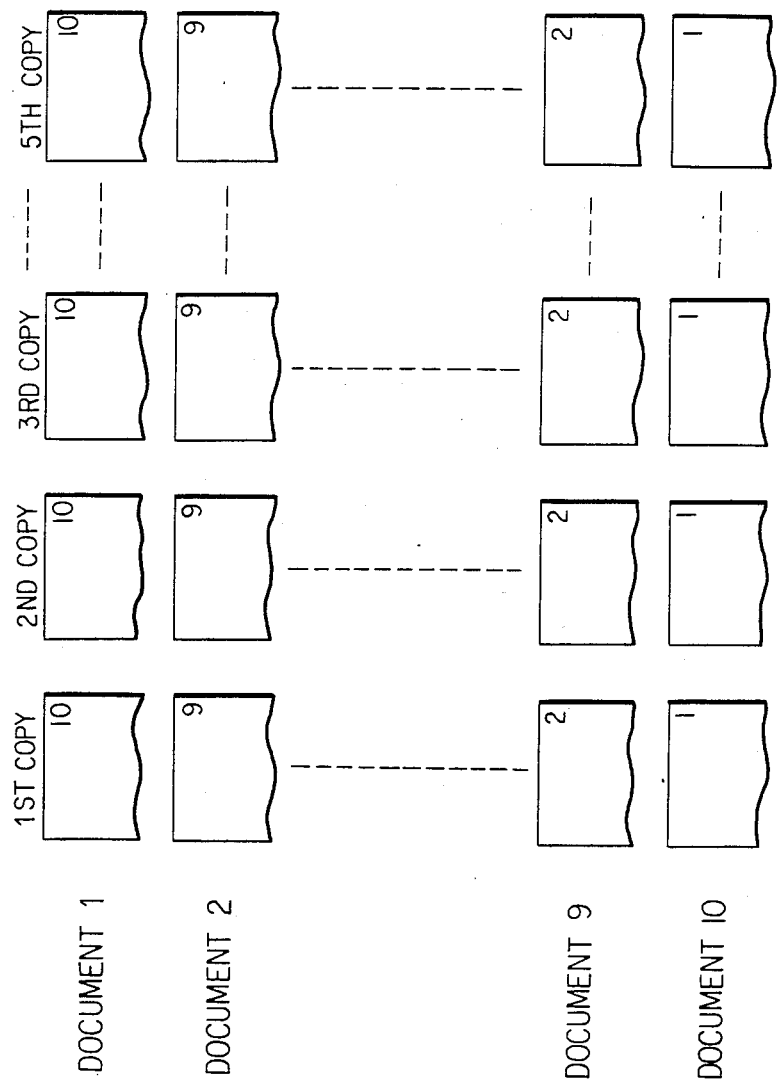
FIG. 11 and FIGS. 12(a) and (b) illustrate for examples of copying on the apparatus of the invention.
Figure 12A:
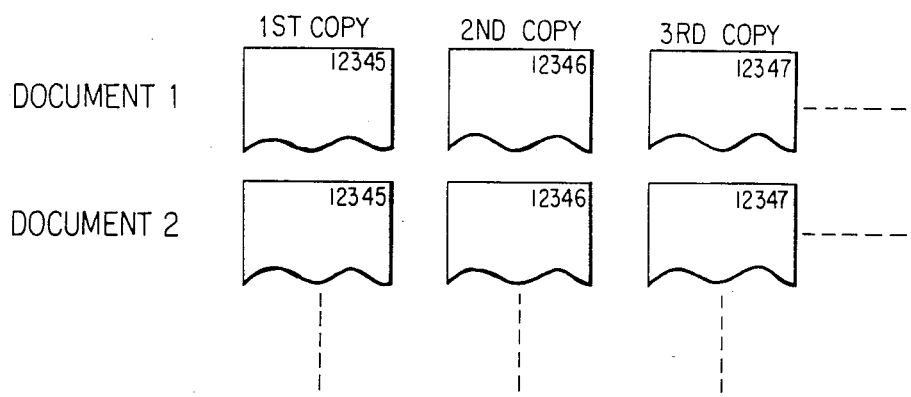
Figure 12B:
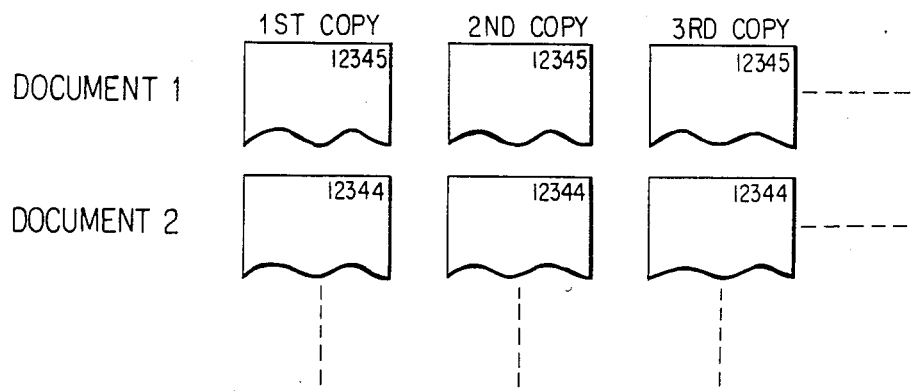
Figure 13:
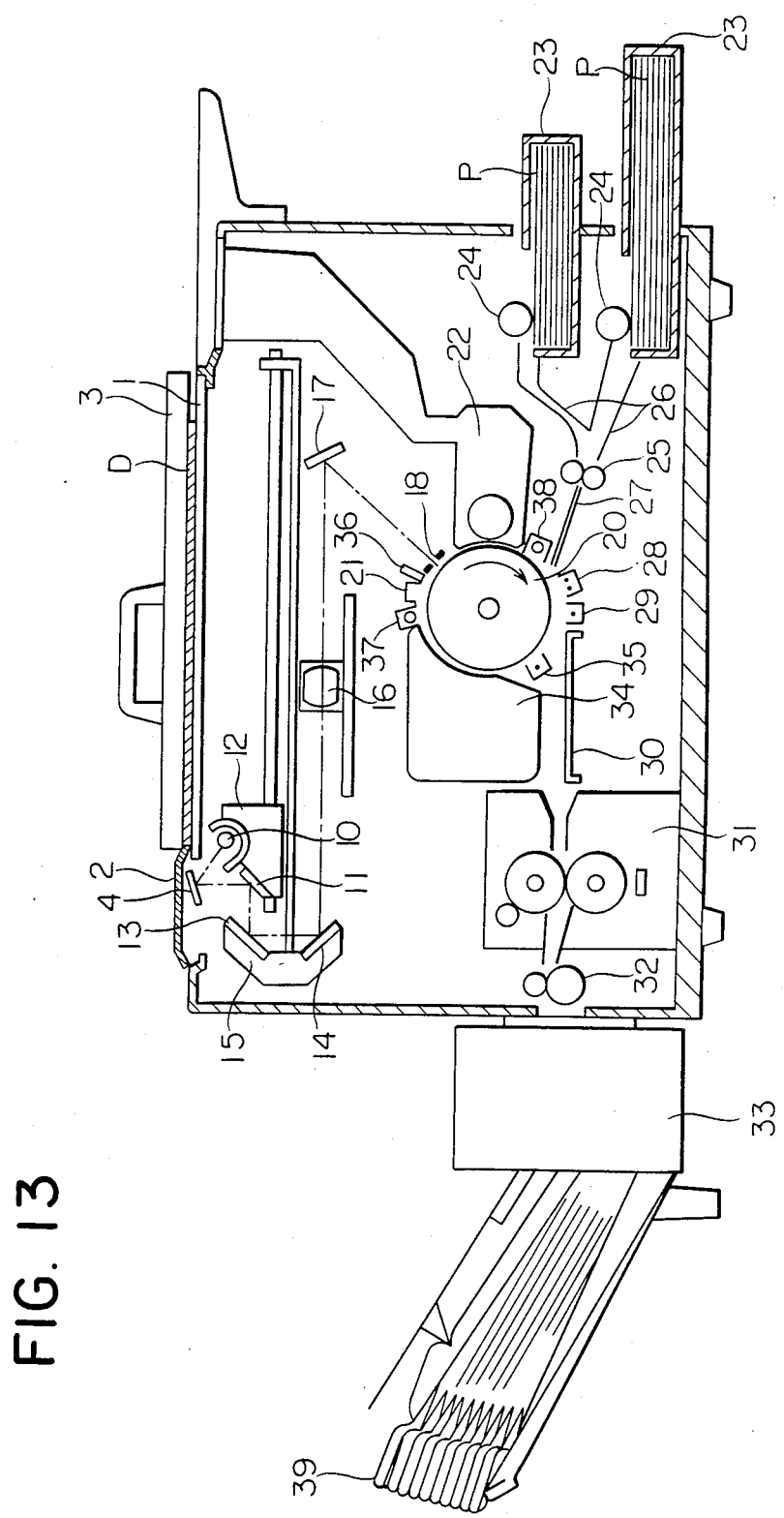
FIG. 13 shows a diagram of the mechanical structure of an example of the invention.

Copies made by a copying apparatus with aforesaid constitution are identical to the conventional general copies when no additional information is copied but in the case of copying the date or number, the additional information may be copied together with document information on the same copy paper. The position of such additional information is, for example, upper right corner when the copy is viewed in its regular attitude. In this instance, because the display plane 4a of liquid crystal display device 4 is inclined facing toward exposure lamp 10, much more scattered light reflected from the display plane 4a is incident upon photoreceptor drum 20 than that in conventional apparatus. Consequently, there appears so little fog that the additional information is very satisfactorily legible. In the case of copying additional information, the document information is slightly reduced in size but this is not a problem at all because of the convenience of additional information copied together with document information. Further, under the number-copying mode, if the number of documents is 10 and the set number of copies is 5, the numbers decreased gradually for each document may be given as shown in FIG. 11 by inputting 10 as a set number and by establishing the set number of copies as 5. Since the number of documents and the set number agree in number, in this case, the number of each copy is a page number of the copy. Incidentally, in the above explanation, an example wherein copying is started from the last page of the document (document 1 in FIG. 11 is the last page) is shown and this is because of the intention to comply with the use of an automatic document feeder (ADF). Therefore, when copying is made from the first page of the document, the constitution should be made so that the set number is determined to be 1 and it is increased gradually. Further in the mode of number-copying, the numbers to be copied can be increased gradually for each copying as shown in FIG. 12 (a) or the numbers to be copied can be decreased gradually for each document as shown in FIG. 12 (b). In the latter case, if the number initially set is caused to agree with the number of documents in quantity, the number of each copy represents a page number. Incidentally, aforesaid example employs a reflection type liquid crystal as an display means for additional information, but it is possible to use the one wherein the light source is provided on the back side of a transmission type liquid crystal or to use ECD (electrochromic display) and Others. Next, FIG. 13 is a structural diagram of a copying apparatus equipped with a sorter that automatically paginates and sorts the copies. Incidentally, the portions in the diagram identical to those in FIG. 1 are given the common symbols.

The paginating system of the sorter 33 is of a type of vertical movement of bins and in its sorting mode, the copies from the first document are delivered to the bins beginning from the first bin (the uppermost bin) up to the n-th bin (n is a set number of copies) while each bin 39 is being elevated and the copies from the second document are delivered to the bins beginning from the n-th bin up to the first bin while each bin 39 is being lowered. Likewise thereafter, an upward mode and a downward mode of the bin 39 are repeated and thereby the copies from the third document and thereafter are delivered to each bin 39. Therefore, the copies from all documents are delivered to each of the bins from the first to the n-th on a one copy from each document basis.

Figure 14:
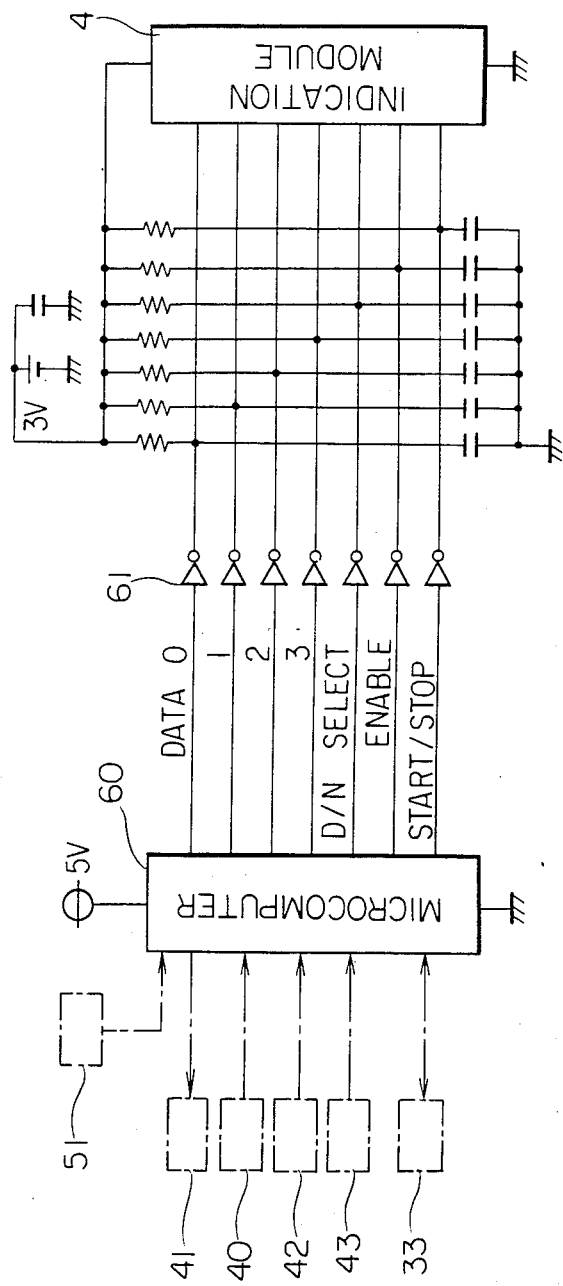
FIG. 14 is an illustration of transferring constitution of the data set, and FIGS. 16(a) and (b) are illustrations of the sample of copying in the example.
Figure 15A:
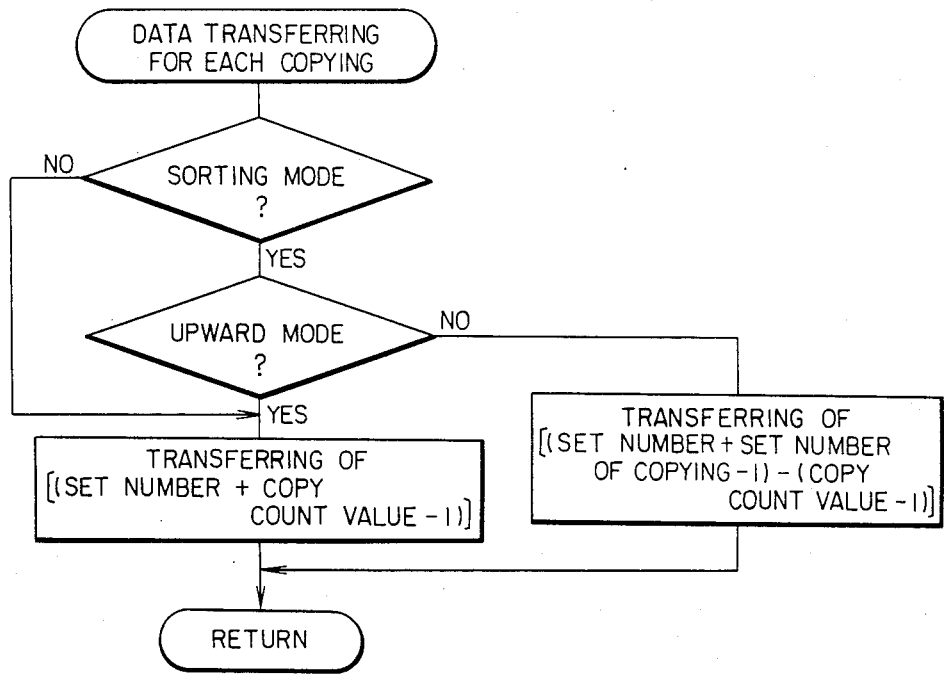
FIGS. 15(a) and (b) are flow charts showing the sub-routine in FIG. 11.
Figure 15B:
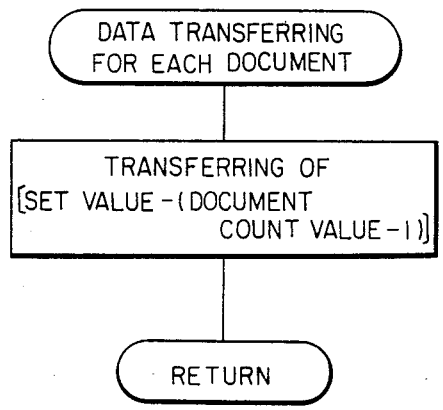

FIG. 14 shows a configuration wherein microcomputer 60 for use of controlling in the main body of copying apparatus transmits the data to the display module 4 through the buffer 61. FIGS. 15(a) and 15(b) show a flow chart of the sub-routine in aforesaid routine. As is clear from FIG. 15(a) in the sub-routine of the transferring for each copying, the judgment is first made for whether the sorter 33 is in a sorting mode or not {when not in a sorting mode, all the copies, for example, are delivered to the first bin (home position)} and when in a sorting mode, the judgment is made for whether the bin 39 is in an upward mode or a downward mode. If it is in an upward mode, 'the set number itself' is transmitted during the first copying, 'the set number +1' is transmitted during the second copying and likewise, 'the set number +m−1' is transmitted during m-th copying. If in a downward mode, on the other hand, 'the set number +n−1' (n is a set number of copies) is transmitted during the first copying after changing to the downward mode and '(the set number +n−1)−(m−1)' is transmitted during the m-th copying. For the data transferring for each document (see FIG. 15(b)), 'the set number−(m−1)' is transmitted during the first copying for the m-th document. Any one of aforesaid data transferring is performed by aforesaid microcomputer 60.

Figure 16A:
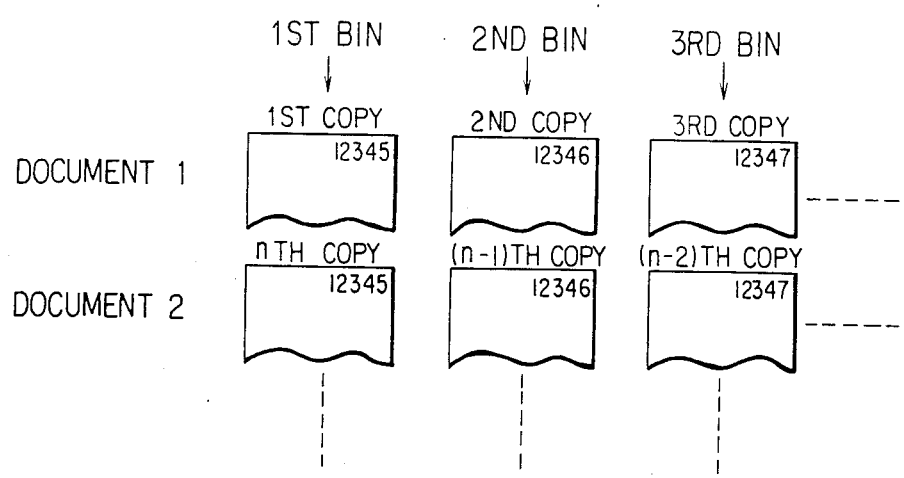
Figure 16B:
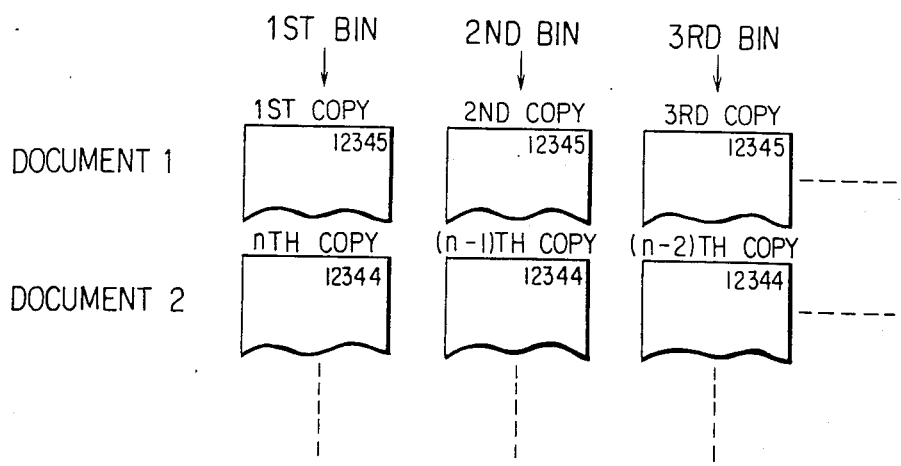

Further, if the sorter 33 is used in a sorting mode through the system wherein the number is increased or decreased gradually for each copying in the number-copying mode, the number is increased in the upward mode of the bin 39 and is decreased in the downward mode and therefore it is possible to copy a different number for each bin 39 as shown in FIG. 16(a). Further, in the case of the system wherein the number is decreased gradually for each document, copies in each bin 39 may be given the number decreased gradually for each document, as shown in FIG. 16(b). In the latter case, if the number of document agrees with the set number, the number for a copy represents a page number for the copy.

As stated above, the display surface of the liquid crystal display device arranged in the main body of a copying apparatus of the invention in inclined toward the exposure lamp and consequently the light dispersed and reflected on the display surface is converged onto the photoreceptor abundantly, thus the fog in the image area of additional information may be controlled at a low level and additional information may easily be read.

A copying apparatus equipped with a liquid crystal display device in the present invention is capable of extremely reducing the labor needed for the work when plural copies of paginated materials are prepared from plural kinds of documents or when the different numbers are given to the copies from the same document. Further, the number is decreased or increased gradually each time the copying of the set number of copies is completed for each document and consequently, the number can correctly be copied.

Further, since the copying apparatus of the invention equipped with a sorter that automatically paginates and sorts the copies is capable of increasing gradually or decreasing gradually the number for each copying depending on whether an upward mode of a bin of the sorter or a downward mode thereof, the copies in each bin have a number copied thereon as an additional information which is different from that on the copies in other bin and is the same on the copies in the same bin.

What is claimed is:

1. An apparatus for recording an image comprising;
a platen adapted for setting thereon a document having one kind of sheet size,
display means for displaying additional information in the proximity of said platen,
light source means for exposing said platen and said display means such that reflected light from said platen and said display means includes a document image and an image of the additional information,
optical means for projecting an image formed by the reflected light from said platen and said display means, and
recording means for recording said projected image on a recording sheet,
wherein said optical means includes means for changing magnification of the projected image so that both an image of said document image and the additional information image can be recorded on a recording sheet having the same sheet size as the document.

2. The apparatus of claim 1 wherein a display plane of said display means is arranged so as to incline toward the light source means.

3. The apparatus of claim 1, wherein said display means comprises a liquid crystal display device.

4. The apparatus of claim 1 wherein said display means indicates a number as said additional information, and further comprising means coupled to said display means for decreasing or increasing both gradually and automatically the number indicated by said display means for each document to be copied.

5. The apparatus of claim 1 wherein said display means includes means for selectively indicating at least one of a date and a number as said additional information, and further comprising mode selection means for causing said display means to indicate a date or a number, and a number-changing means for increasing gradually or decreasing gradually and automatically said number for each copy or for each number when said display means is in a number-display mode.

6. The apparatus of claim 1 wherein said display means include means for indicating a number as said additional information, and further comprising a number-changing means coupled to said display means for automatically decreasing or increasing gradually the number indicated by said display means, said number being decreased or increased gradually by said number-changing means each time a copying of a said number of copies is completed for each document.

7. The apparatus of claim 1, wherein the projected image includes an image of the entire document set on the platen and adjacent to it the image of the additional information.

* * * * *